Feb. 5, 1929.
J. E. ELKINGTON
1,701,066
FLUID SPRAYER FOR DISHWASHING MACHINES
Filed Jan. 18, 1927
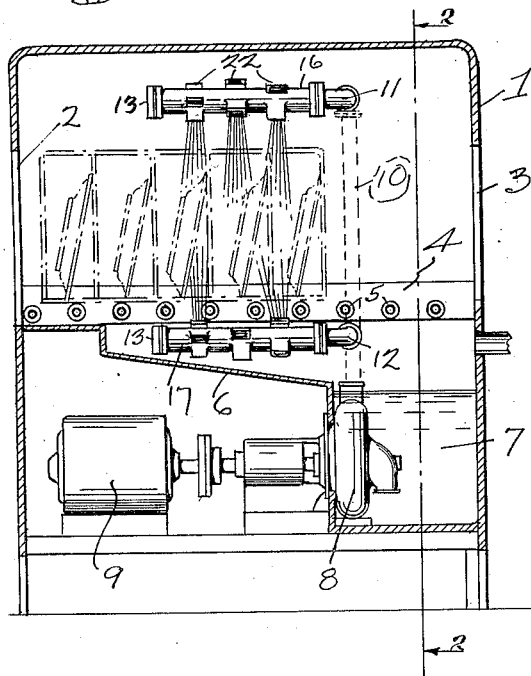
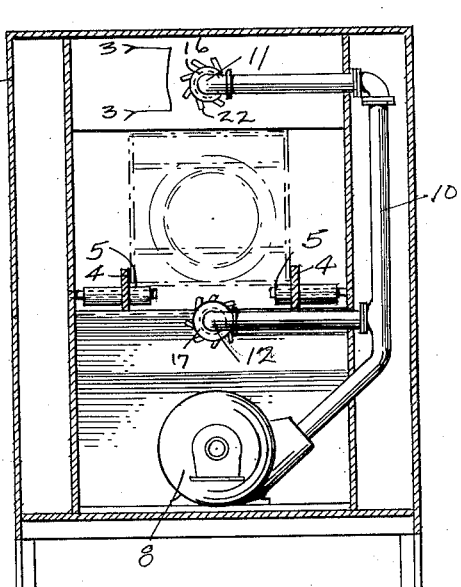
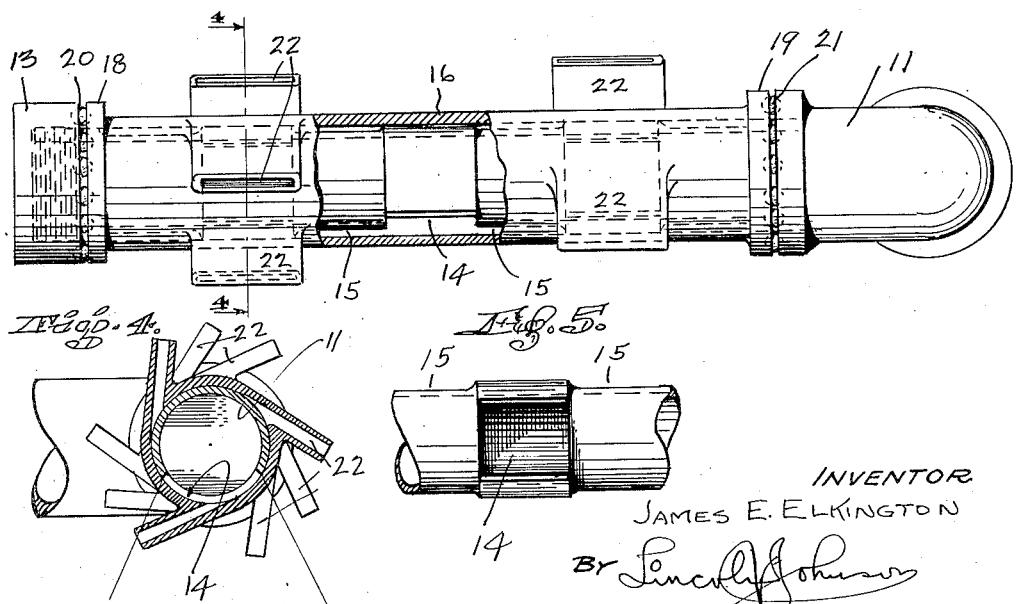
INVENTOR
JAMES E. ELKINGTON
BY
ATTORNEY.

Patented Feb. 5, 1929.

1,701,066

UNITED STATES PATENT OFFICE.

JAMES E. ELKINGTON, OF SAN FRANCISCO, CALIFORNIA.

FLUID SPRAYER FOR DISHWASHING MACHINES.

Application filed January 18, 1927. Serial No. 161,750.

This invention relates particularly to a fluid spraying pipe for spraying fluid, under pressure, onto articles to be cleaned.

A further object of the invention is to provide a fluid spraying device for a dish washing machine that consists of a casing, having radially extended nozzles thereon, rotatably mounted upon a fluid spray pipe, whereby the pressure of the fluid passing from the spray pipe through the casing will cause the casing to rotate as the fluid passes out through the nozzles.

A still further object of the invention is to provide a fluid spraying device for dish washing machines, having a fluid spray pipe with apertures cut therein throughout a portion of the periphery of said pipe and which is enclosed by a rotatable casing having nozzles therein that are adapted to register with the apertures cut in the spray pipe so that fluid will only be discharged through the nozzles within a predetermined arc of the revolution of the casing.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings,

Fig. 1 is a sectional view through a dish washing machine having the sprayer pipes constructed in accordance with my invention, operatively mounted therein.

Fig. 2 is a cross section taken through Fig. 1 on the line 2—2.

Fig. 3 is an enlarged front elevation of one of the fluid sprayers taken on the line 3—3 of Fig. 2.

Fig. 4 is a section taken through Fig. 3 on the line 4—4.

Fig. 5 is a view of a fragmentary portion of one of the sprayer pipes showing the discharge port therein.

In detail, the construction illustrated in the drawings comprises a frame 1, entirely closed on its top, bottom and sides, but having openings 2 and 3 through its opposite ends, to permit the passage of a dish carrying rack therethrough. A guideway 4 is provided transversely across the casing 1, in alignment with the ports 2 and 3, to insure that the dish carrying rack will have a direct passage through the machine. Rollers 5 or some other type of conveying means, are provided on the guideway 4 to permit the free passage of the dish carrying rack through the machine. In the bottom 6 of the casing 1, I provide a tank or reservoir 7 which is adapted to hold fluid capable of effecting the cleansing of the articles to be cleaned, when such fluid is directed into contact with the said articles. A rotary pump 8 is provided in the tank 7, and a motor 9 situated outside of the tank is connected to the pump 8 to rotate said pump. The pump 8 is connected by a pipe 10 to a sprayer pipe 11 located adjacent the top of the housing 1, above the articles to be cleaned and to a sprayer pipe 12 located adjacent the bottom of the housing 1, beneath the articles to be cleaned.

The sprayer pipes 11 and 12 are duplicates one of the other, and each consists of a length of hollow pipe connected at one end to the fluid spray conduit 10, and closed at the other end by a suitable pipe cap 13. Each sprayer pipe is provided with a plurality of discharge ports 14 therein arranged in spaced relation along one side of the pipe throughout the entire length thereof. The ports 14 extend around about one third of the circumference of the pipe. In the upper sprayer pipe, the ports 14 face down onto the articles to be cleaned, while in the lower spray pipe the ports 14 face up toward the articles to be cleaned. The sprayer pipe between the discharge ports 14 is reduced in diameter as at 15, below the full diameter of the sprayer pipe, for the purpose to be hereinafter described.

A casing 16 envelops the upper sprayer pipe 11 and a similar casing 17 envelops the lower sprayer pipe 12. Each of the respective casings 16 and 17 have their opposite ends 18 and 19 held in roller bearings 20 and 21, respectively, mounted on the sprayer pipes, to permit the free rotation of each casing around the sprayer pipe on which it is mounted. The inner diameter of each casing is slightly larger than the outer diameter of the sprayer pipe, so that no surface friction will be set up as the casing is rotated around the sprayer pipe.

The exterior of each casing 16 and 17 is provided with a plurality of discharge nozzles 22 extending therefrom in a direction substantially tangentially to the periphery of said casing. Series of the tangentially disposed discharge nozzles 22 are arranged around the circumference of the casing, to register with one of the discharge ports 14 in the sprayer pipe. The successive series of sprayer nozzles 22 are offset with respect to each other, so that the fluid will be discharged from each series of sprayer nozzles at a different period of time than from any other series of sprayer nozzles. Fluid that is supplied to each of the sprayer pipes 11 and 12 from the pump 8 passes out through the discharge ports 14 in the sprayer pipe through the corresponding registering discharge nozzles 22 in the rotatable casing, and into contact with the articles to be sprayed. The pump 8 creates sufficient pressure on the fluids to cause the said fluid, by reaction thereof when discharging from the nozzles, to rotate said casing about the sprayer pipe. The fluid is discharged through the sprayer nozzles as each of the sprayer nozzles comes into registry with the discharge ports 14 in the sprayer pipe. Thus, the sprayer nozzles 22 discharge throughout only one third of a revolution and during the remainder of the revolution, there is no fluid discharge from said nozzles. In order to cause each casing with the nozzles 22 thereon to rotate automatically around the sprayer pipe, by the reaction of the fluid being discharged through said nozzles, I have found that it is necessary to maintain a substantially uniform pressure of the fluid to be sprayed within the entire interior of each rotatable casing. The reduced portions 15 of the sprayer pipe permit the fluid under pressure to circulate throughout the entire length of the interior of the casing, and hence to balance the rotatable casing on the sprayer pipe.

Before operating the machine for washing, the dishes or articles to be cleaned are placed on trays and the trays moved into the interior of the sprayer housing. The pump 8 is then started in operation, to force the liquid into each of the sprayer housings and outwardly through the discharge nozzles in the rotatable casings. The sprayer casings will start rotating as soon as the fluid from the pump is discharged therefrom. The fluid is sprayed from the nozzles in constantly shifting streams upon the dishes to be cleaned. The fluid is also delivered under a pressure that is sufficient to cleanse all waste material from the dishes but insufficient to throw the dishes from the racks and to cause breakage thereof.

Having thus described this invention, what I now claim and desire to secure by Letters Patent is:

1. A fluid spraying device comprised of a sprayer pipe closed at one end and connected at its opposite end to a fluid pump, said pipe having a plurality of separate longitudinally spaced discharge ports arranged along one side thereof; a casing enveloping the pipe and rotatably mounted thereon; and a plurality of longitudinally spaced series of nozzles on said casing and communicating with the interior thereof, the nozzles of each series arranged tangentially to the periphery of the casing and circumferentially therearound to register successively with one of said discharge ports in the sprayer pipe to discharge fluid from the said pipe and cause the casing to rotate around the sprayer pipe.

2. A fluid spraying device comprised of a sprayer pipe closed at one end, the other end thereof being adapted to be connected to a fluid conduit, said pipe having a plurality of separate, longitudinally spaced discharge ports arranged along one side thereof; a casing enveloping the pipe and rotatably mounted thereon; the outer periphery of said pipe being reduced in diameter between the discharge ports to permit the circulation of fluid around the exterior thereof; and a plurality of longitudinally spaced series of nozzles on said casing communicating with the interior thereof, the nozzles of each series being arranged tangentially to the periphery of the casing and circumferentially therearound to register successively with one of said discharge ports in the sprayer pipe to discharge fluid from the said pipe and cause the casing to rotate around the sprayer pipe.

In testimony whereof, I have hereunto set my hand at San Francisco, California, this 13th day of January, 1927.

JAMES E. ELKINGTON.